Dec. 14, 1926.
F. LEISTER
1,610,958
DIFFERENTIAL GEAR CONSTRUCTION
Filed Jan. 2, 1926
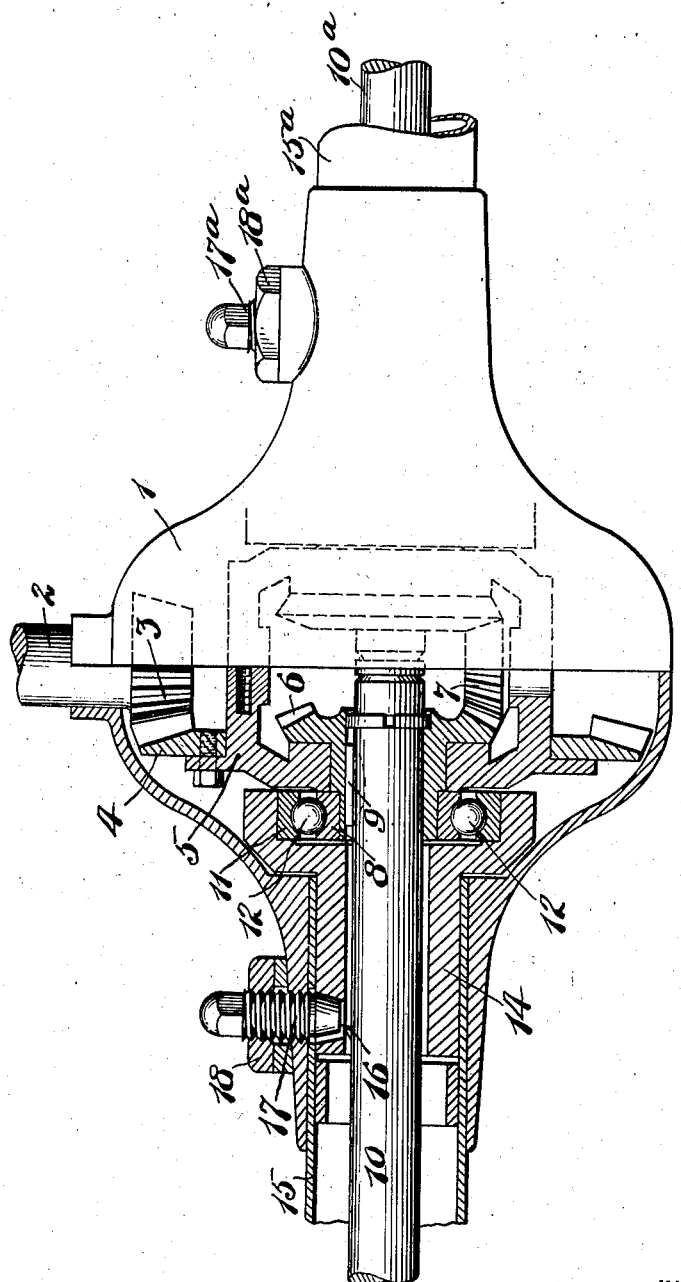
INVENTOR
Fayette Leister
BY
Mitchell & Becher
ATTORNEYS Patented Dec. 14, 1926.

1,610,958

UNITED STATES PATENT OFFICE.

FAYETTE LEISTER, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

DIFFERENTIAL-GEAR CONSTRUCTION.

Application filed January 2, 1926. Serial No. 78,786.

This invention relates to new and useful adjusting means for differential driving mechanism. The main object of the invention is to provide simple durable and effective means, whereby exceedingly accurate adjustments may be made in such mechanism for the purpose of securing such a meshing fit between the gears as will assure the quiet running of the same.

This and other objects will be apparent to a mechanic skilled in this art by a reading of the following description and an examination of the accompanying drawing, in which—

The single figure is a plan view, partly in section, of such parts as it is necessary to illustrate in order to make clear the construction and operation of one preferred form of my invention, the differential shown being of the type used on automobiles.

In the drawing, 1 represents a differential housing. One half of this housing and the parts contained therein appear in section. It will be understood that except as to the ring gear there are parts within the other half of the casing 1, as indicated in dotted lines, that correspond to those shown in section, and therefore a detailed description of the latter only will suffice.

2 is a propeller shaft so called, which is driven from some suitable source of power. 3 is a driving pinion on the end of the shaft 2 within the differential housing. 4 represents a differential ring gear secured in the customary way to a carrier frame 5. 6 is a "sun" gear having a hub extension, on which the carrier frame 5 may rotate or oscillate when differential action is occurring. 7 illustrates one of the usual "planet" gears, mounted for rotation on the carrier 5. On the sleeve of the gear 6 is also mounted the inner ring 8 of an anti-friction bearing. 9 is a long key by which gear 6 is splined to the driven shaft end 10, which latter is suitably connected to the wheel (not shown) of the vehicle to be driven. 11 represents the outer ring of the anti-friction bearing. Anti-friction devices, such as balls 12—12 are located between the rings 8 and 11. The anti-friction bearing shown herein is preferably of the unit handling type and is capable of taking both radial load and thrust. 14 is a bearing bushing provided at each end of the assembly and having a sliding fit within the ends of the housing 1. These constitute the main support for the assembly. The outer ring 11 of the anti-friction bearing is mounted in one end of the bearing bushing 14. 16 is a tapered hole or slot in the bushing 14. 17 is an adjusting screw, having a tapered nose projecting into the hole 16. This screw is carried by the sleeve-like end of the housing 1 in which the tubular extension 15 is mounted. 18 is a check nut for locking the screw 17 in any desired position of adjustment.

It will be understood that the corresponding parts within the opposite end of the housing 1 from that shown in section are arranged oppositely to those which have thus far been described. $10^a$ represents the driven shaft end for the other vehicle wheel. $15^a$ represents the tubular extension for the other end of the differential housing. $17^a$ represents the other adjusting screw, which works in opposition to the adjusting screw 17, and $18^a$ represents the check nut for the adjusting screw $17^a$.

It is well understood that in the manufacture of differential mechanism it is exceedingly important that the various parts constituting the same shall be manufactured with such accuracy that, when assembled, the gears will intermesh as nearly as possible in accordance with the designer's intentions so as to secure quiet running. Accordingly, very little tolerance can be allowed in the manufacture of each individual part. By the present invention it is possible to have much more liberal manufacturing tolerance, because, by means of the adjusting mechanism, variations that would otherwise be fatal to a quiet running may be compensated for. It is highly important that the ring gear 4 should mesh properly with the drive pinion 3. Heretofore this fit depended upon the accuracy of manufacture of the various parts, and therefore it is apparent that uniformity in the product has been difficult of attainment. By the present invention an adjustment is provided whereby the gears 3—4 may be caused to mesh, so as to cooperate in the quietest possible manner even though the usual manufacturing tolerances have been exceeded.

When the parts are all assembled adjustment is effected as follows: If the meshing of the gear 4 with the gear 3 is obviously too loose for quiet running, the adjusting screw 17ª is retracted and the adjusting screw 17 is projected. This causes the tapered nose of the screw 17 to engage the bearing bushing 16, so as to wedge it to the right to the necessary extent and, since this is directly connected with all the other parts of the differential mechanism up to and including the ring gear, these parts all move bodily to the right correspondingly and bring the gears 4—3 into closer mesh.

If the meshing is found to be too tight, bodily movement in an opposite direction to the above parts is effected by retracting screw 17 and projecting screw 17ª to the desired degree.

This endwise adjustment of the differential assembly may be made while the mechanism is running, and hence it is possible for the operator to adjust these parts with the utmost nicety.

When the desired adjustment has been attained, both screws 17—17ª should bear firmly against their respective bearing bushings, so as to hold the differential assembly against further endwise movement, until it may become desirable to again adjust. So far as I am aware the means for effecting this endwise adjustment of the differential carrier and associated parts is novel.

I have shown and described my invention in one preferred and successful form, but I wish it to be understood that various modifications and changes may be made in construction and design without departing from the spirit of the invention or the scope of the following claim.

While I have shown my new adjusting means as associated with differential gear mechanism in such a way as to move the ring gear toward and from the pinion gear, I may apply the same principle to the adjustment of the pinion gear, so as to move the same toward and from the ring gear, as I purpose to show in a separate application, which embodies broadly the same principle of adjustment as disclosed and claimed herein.

I claim:

In a differential transmission mechanism, a housing, a differential assembly unit therein, including a carrier, sun and planet gears carried thereby, a beveled ring gear carried thereby, two supporting bushings slidable but non-rotatable within the housing and supporting the carrier, a beveled driving pinion mounted within the housing independently of the differential assembly and co-acting with said beveled ring gear, and means for shifting the carrier to control the adjustment between the ring gear and the driving pinion, said means comprising two independently operable adjusting screws arranged, respectively, at opposite ends of the housing and both accessible at the outside thereof, the inner ends of said adjusting screws making oppositely-pitched beveled engagement with said bushings, respectively, whereby said carrier and its associated parts may be positively moved to any degree for varying the aforesaid adjustment, one of said screws moving said carrier in one direction only, the other screw moving said carrier in the opposite direction only.

FAYETTE LEISTER.